June 24, 1941. G. KIEFER 2,246,733
TRANSMISSION GEAR FOR CHANGING ROTATING MOVEMENTS
INTO RECIPROCATING MOVEMENTS
Filed March 20, 1939
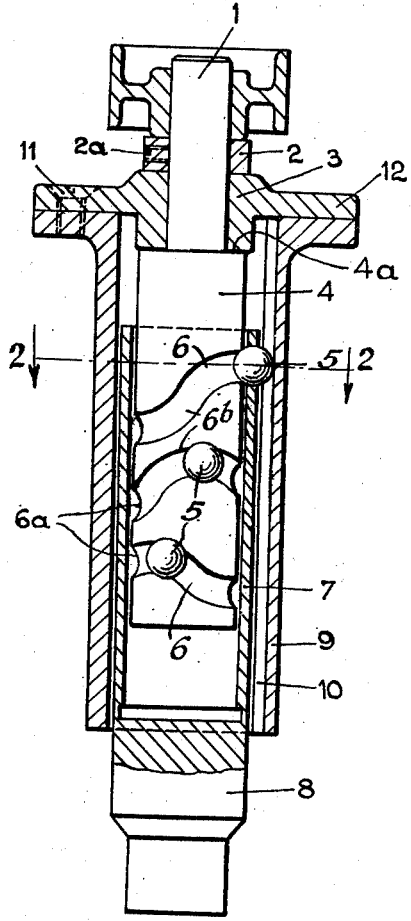
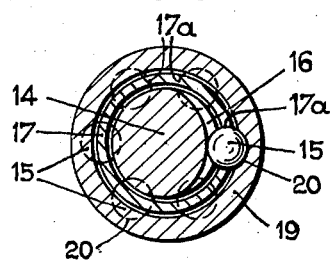
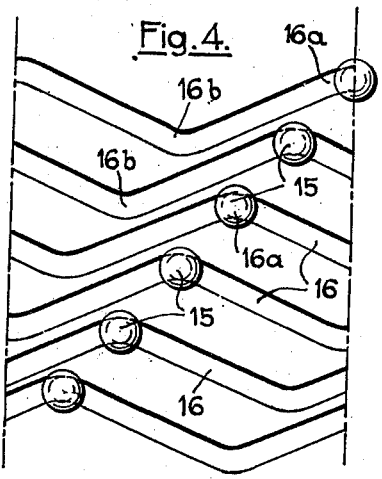
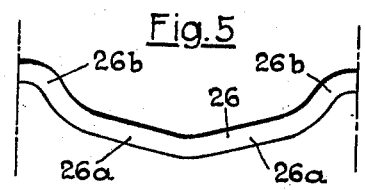
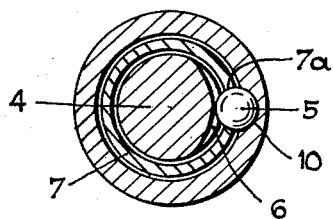
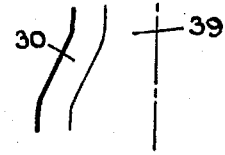
Inventor,
Gustav Kiefer
by Frank S. Appleman
attorney Patented June 24, 1941

2,246,733

UNITED STATES PATENT OFFICE 2,246,733

TRANSMISSION GEAR FOR CHANGING ROTATING MOVEMENTS INTO RECIPROCATING MOVEMENTS

Gustav Kiefer, Rio de Janeiro, Brazil, assignor to Sociedade Industrial de Maquinas Fekima Limitada, Rio de Janeiro, Brazil Application March 20, 1939, Serial No. 262,987
In Germany October 3, 1938

1 Claim. (Cl. 74—57)

This invention relates to mechanical movements, and has special reference to a mechanism for effecting translation between rotary and reciprocatory movements.

One important object of the invention is to provide an improved mechanism for the purpose, wherein anti-friction devices are employed to effect the translation.

A second important object of the invention is to provide a novel device for the purpose wherein freely rolling balls are employed to effect the translation.

A third important object of the invention is to provide a novel device for the purpose, wherein the speed of translation may, by proper design of the parts, be caused to vary at different parts of the movement of the driven element.

With the foregoing and other objects in view, the invention consists in the details of construction, and in the arrangement and combination of parts to be hereinafter more fully set forth and claimed.

In describing the invention on detail, reference will be had to the accompanying drawing forming part of this application, wherein like characters denote corresponding parts in the several views, and in which—

Figure 1 illustrates a vertical median section of one form of the invention;

Figure 2 illustrates a section on the line 2—2 of Fig. 1;

Figure 3 illustrates a similar section showing a modification of the device wherein a series of balls is employed;

Figure 4 illustrates a series of developed diagrams showing positions of the balls and grooves shown in Fig. 3;

Figure 5 illustrates a developed view of a modified form of groove;

Figure 6 illustrates a view showing a diagrammatic arrangement in elevation of a form of groove for guiding the balls; and Figure 7 illustrates a plan view of the groove arrangement of Fig. 6.

In the embodiment shown in Figs. 1 and 2, there is provided an inner guide member having a shank 1 which is supported in a collar fixed thereon as by the set screw 2a. On the lower end of the shank 1 is mounted a head 3. Also, there is fixed on the lower end of the shank a cylindrical guide 4 having a shoulder 4a at its upper end and the head is held between the shoulder and the collar 2. In the guide member 4 is formed a pair of endless grooves 6, so formed as to have longitudinally displaced portions 6a connected by spiral portions 6b. Surrounding the member 4 is a sleeve 7 carried on the upper end of a reciprocatory member 8. Surrounding the sleeve 7 is an outer sleeve 9 which is fixed to the flange 12 of the head 3 by screws, one of which is shown at 11. The sleeve 9 is provided internally with a longitudinal groove 10. In the sleeve 7 are formed ball sockets 7a and balls 5 are held in these sockets and engage in the grooves 6 and also in the groove 10. The sleeve 9 is fixed against movement. Suitable means 12a such as a pulley is used to rotate the member 4.

In operation, rotation of the member 4 causes the balls to be moved longitudinally of the member 4 by the action of the grooves 6 because these balls can only move longitudinally, owing to their engagement with the fixedly positioned groove 10. Consequently, the engagement of these balls 5 in the sockets 7a causes reciprocatory movement of the sleeve 7 and member 8.

In Figs. 3 and 4, there are six grooves 16 in the rotary guide 14 corresponding to the grooves 6 in the first form. The inner sleeve 17 has a corresponding number of sockets 17a and balls 15 and the outer sleeve 19 has a like number of vertical grooves 20. As shown in Fig. 4, the high points 16a and low points 16b are stepped around the member 14.

The operation of this form is identical with that of the first form.

In the form of groove 26 shown in Fig. 5, means are provided for variable reciprocation, due to the difference in angular disposition of various parts of the groove, the portions 26a causing slower advance and retreat of the reciprocatory element than the portions 26b.

In Figs. 6 and 7, the action of the fixed grooves as 10 is modified by making such grooves in the fixed member 39 of a form other than straight as shown at 30.

There has thus been provided a simple and efficient device of the kind described and for the purpose specified.

I claim:

In apparatus for effecting translation from rotary to reciprocatory motion, an outer cylindrical member having an outwardly extending flange at its upper end, said member having a plurality of rectilinear ball receiving grooves on its inner surface, a head extending over the upper end of said member and secured to the flange thereof, said head having a centrally disposed bore, a rotatable member having a cylindrical body concentric with and of less diameter than the internal diameter of the outer member whereby to leave an annular space between the outer member and said body, said body having a plurality of endless spiral ball grooves extending therearound, a stem on the end of said body fitting said bore and projecting therethrough to receive rotary driving means, a driven member having a hollow cylindrical end located between the first member and said body and provided with ball receiving openings, and balls each mounted in one of said openings and each engaging one of said longitudinal grooves and a respective spiral groove.

GUSTAV KIEFER.